(No Model.)  6 Sheets—Sheet 1.

H. G. RAMSPERGER.
PHOTOGRAPHIC ROLL HOLDER.

No. 448,801. Patented Mar. 24, 1891.

WITNESSES:
A. Faber du Faur
W. F. Bristol

INVENTOR:
Hermann G. Ramsperger.
BY A. Faber du Faur Jr.
his ATTORNEY.

THE NORRIS PETERS CO., PHOTO-LITHO., WASHINGTON, D. C.

(No Model.) 6 Sheets—Sheet 2.

H. G. RAMSPERGER.
PHOTOGRAPHIC ROLL HOLDER.

No. 448,801. Patented Mar. 24, 1891.

(No Model.) 6 Sheets—Sheet 3.
H. G. RAMSPERGER.
PHOTOGRAPHIC ROLL HOLDER.

No. 448,801. Patented Mar. 24, 1891.

WITNESSES:
A. Faber du Faur
W. H. Bristol

INVENTOR:
Hermann G. Ramsperger.
BY A. Faber du Faur Jr.
his ATTORNEY.

(No Model.) H. G. RAMSPERGER. 6 Sheets—Sheet 4.
PHOTOGRAPHIC ROLL HOLDER.
No. 448,801. Patented Mar. 24, 1891.
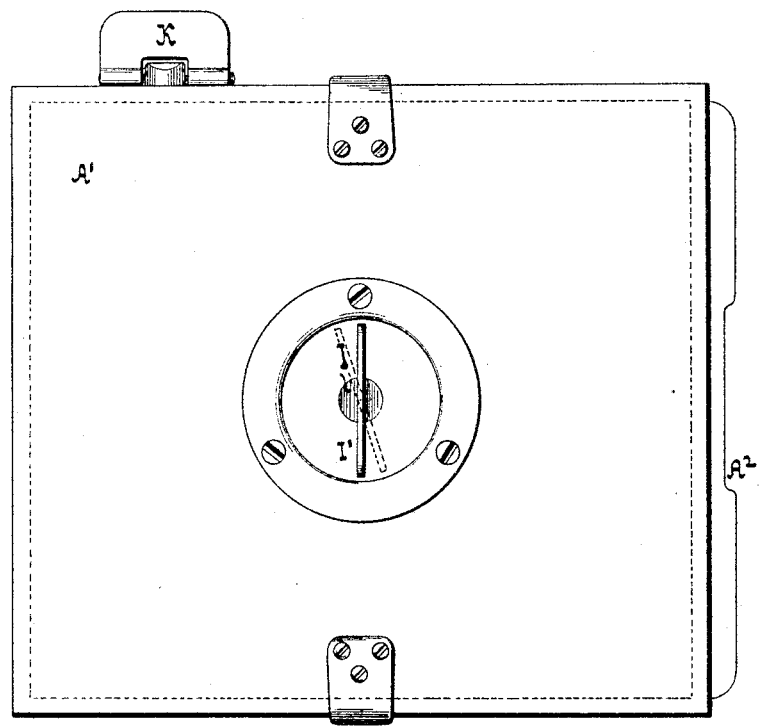
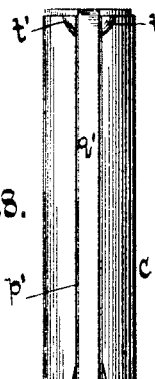
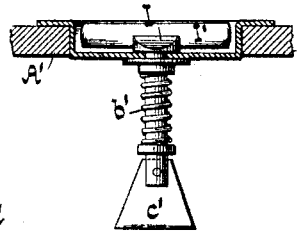
WITNESSES:
A. Faber du Faur
W. H. Bristol
INVENTOR:
Hermann G. Ramsperger.
BY
A. Faber du Faur
his ATTORNEY

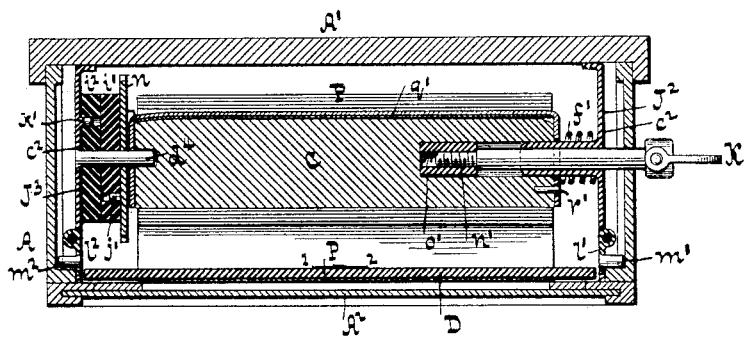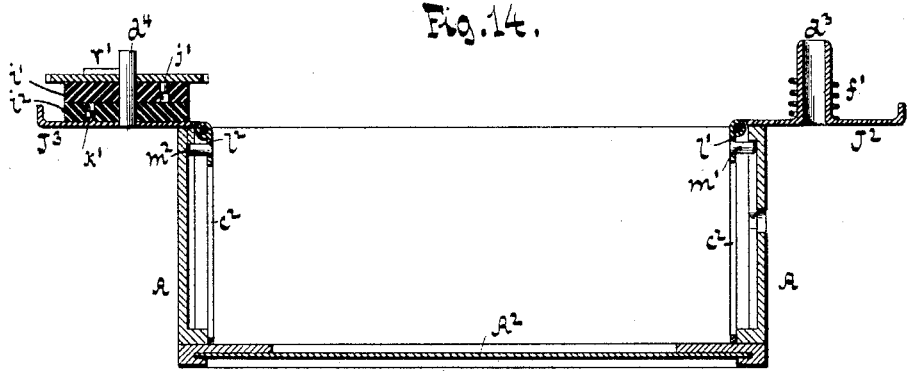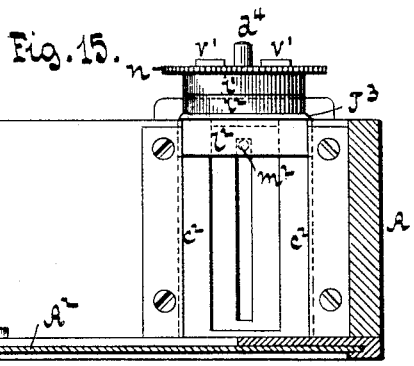

(No Model.) 6 Sheets—Sheet 6.

H. G. RAMSPERGER.
PHOTOGRAPHIC ROLL HOLDER.

No. 448,801. Patented Mar. 24, 1891.

WITNESSES:
A. Faber du Faur
W. H. Bristol

INVENTOR:
Hermann G. Ramsperger.
BY A. Faber du Faur jr.
ATTORNEY

UNITED STATES PATENT OFFICE.

HERMANN G. RAMSPERGER, OF NEW YORK, N. Y.

PHOTOGRAPHIC ROLL-HOLDER.

SPECIFICATION forming part of Letters Patent No. 448,801, dated March 24, 1891.

Application filed February 18, 1890. Serial No. 340,862. (No model.)

*To all whom it may concern:*

Be it known that I, HERMANN G. RAMSPERGER, a citizen of the United States, and a resident of New York, in the county and State of New York, have invented certain new and useful Improvements in Photographic Roll-Holders, of which the following is a specification.

My invention has reference to improvements in roller-holders for exposing sensitive photographic films, and has for its object to improve the construction of such devices by providing novel means for facilitating the insertion and removal of the several rolls, and also by providing improved means for perforating or slitting the film as a guide for its subsequent division and means for measuring off the proper length for exposure and for arresting the motion of the receiving-roll after the proper length of the film for exposure has been reeled off.

My invention, furthermore, consists in certain novel means for indicating the number of exposures made, and also in new constructions for the receiving-roll and the friction devices for straining the film upon its support, all of which is more fully pointed out in the following specification and claims, and illustrated in the accompanying drawings, in which—

Figure 1:
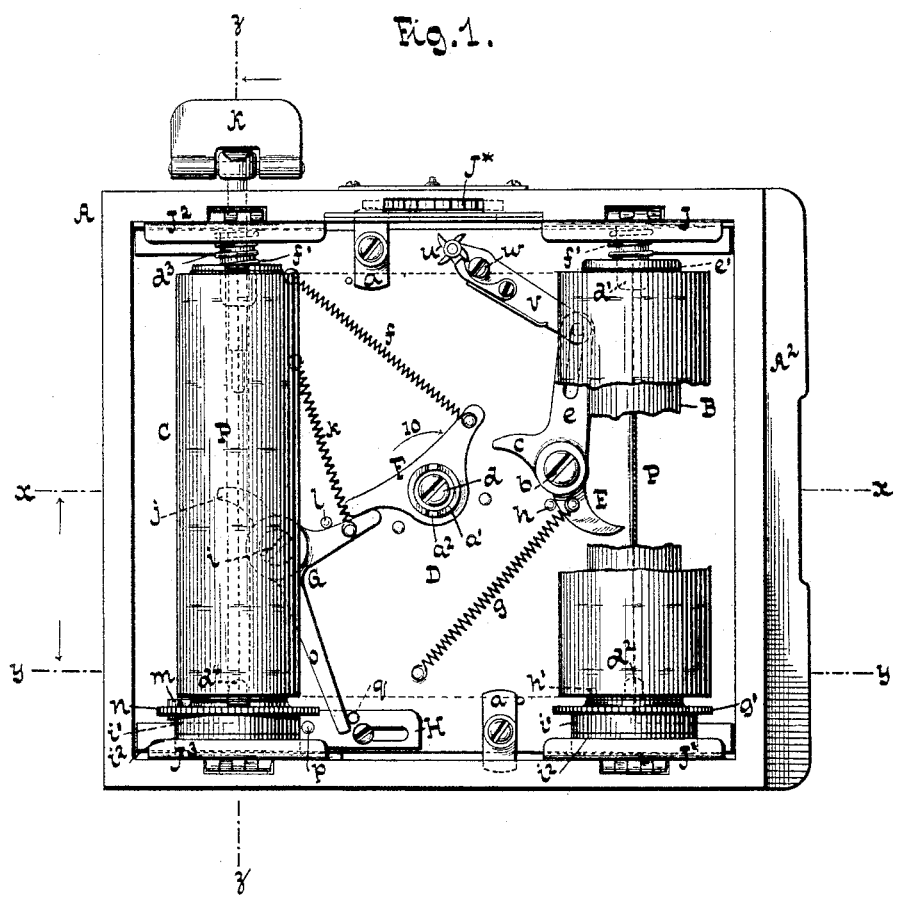
Figure 2:
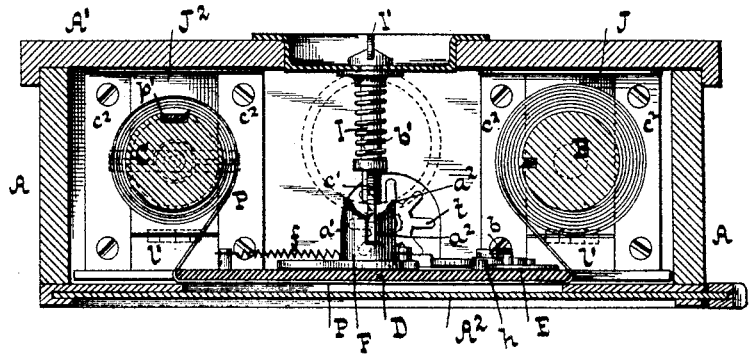
Figure 3:
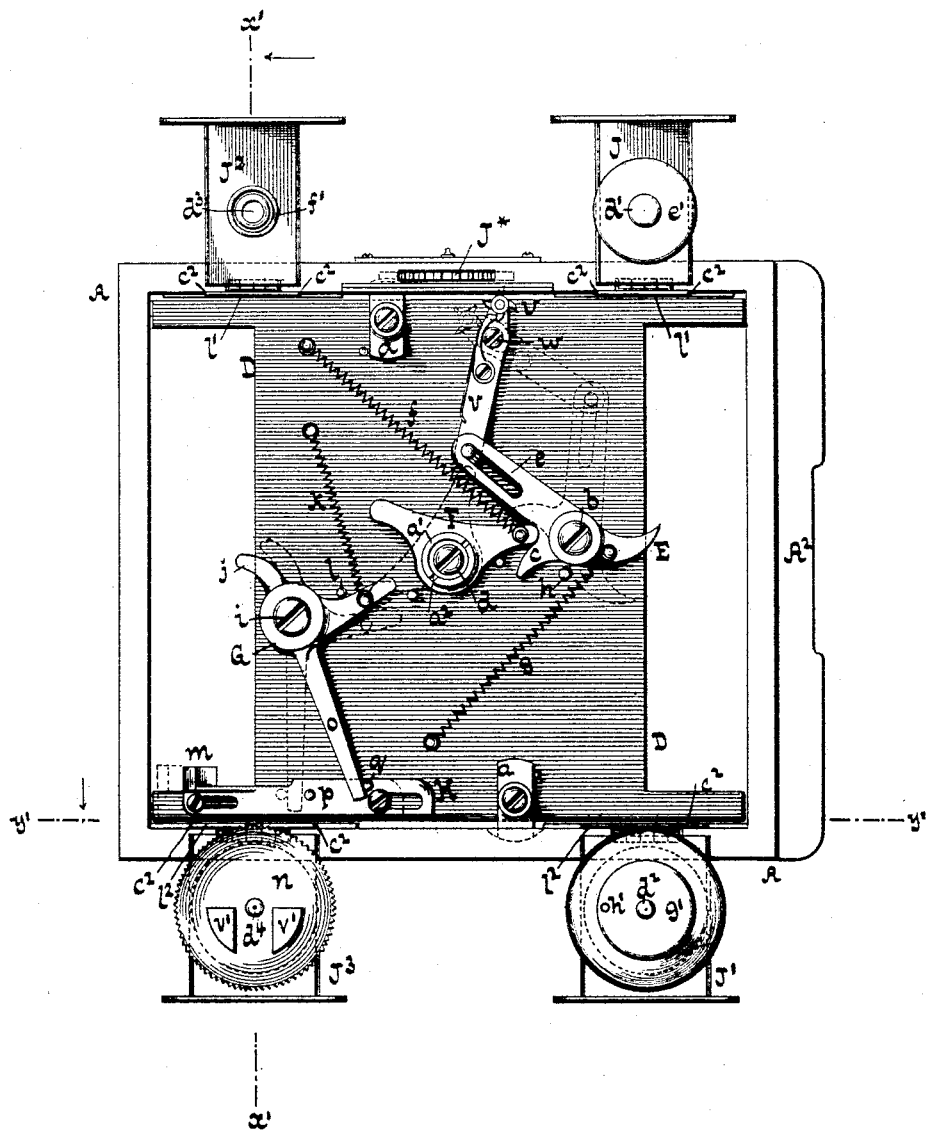
Figure 4:
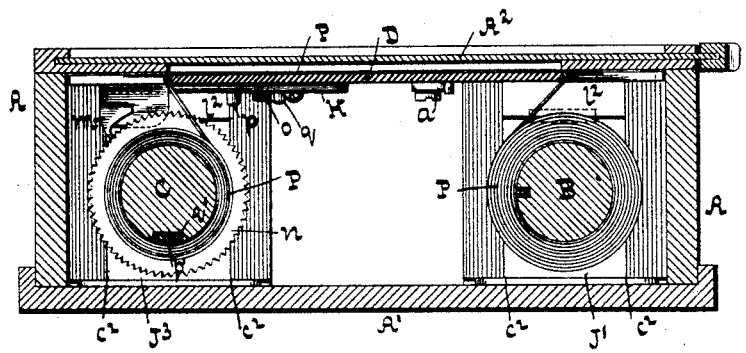
Figure 5:
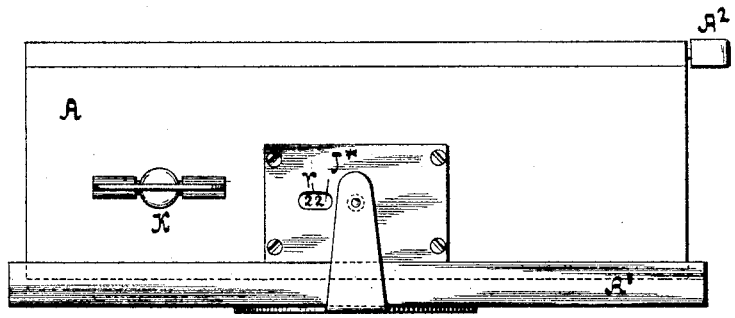
Figure 6:
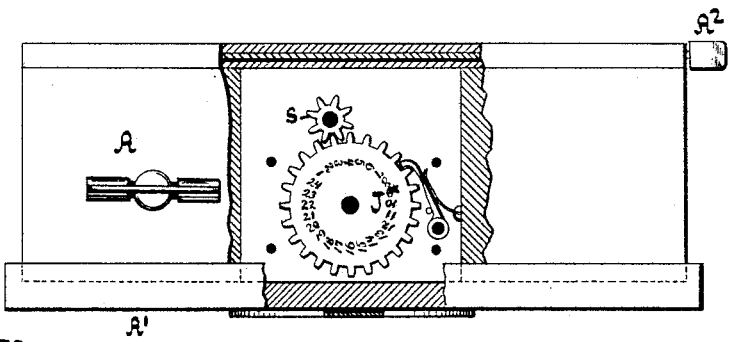
Figure 16:
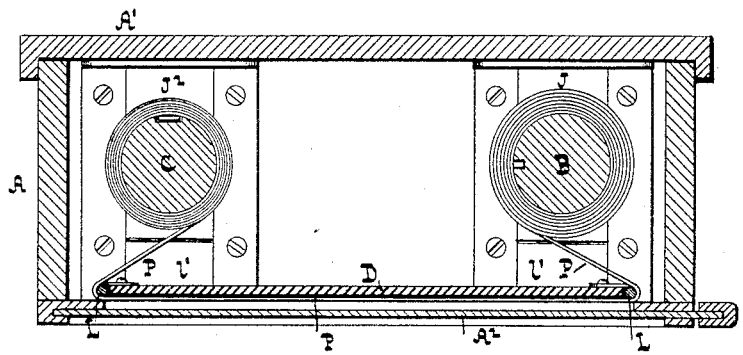
Figure 17:
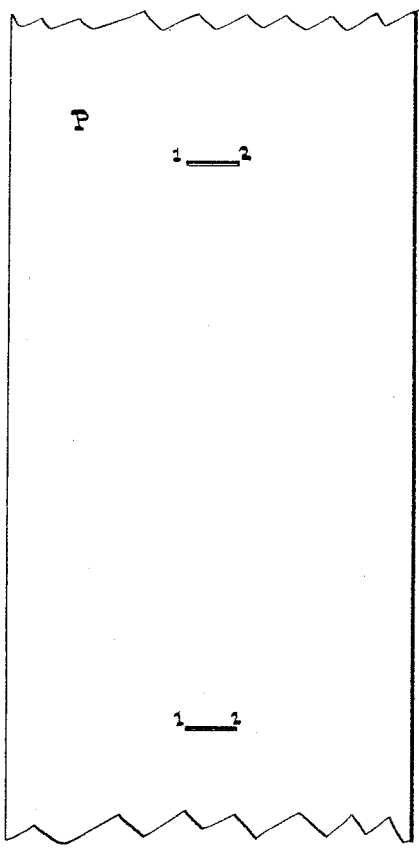

Figure 1 represents an elevation of the roller-holder with the cover removed and part of the supply-roll broken away. Fig. 2 is a transverse section in the plane $x\,x$, Fig. 1, the cover being in its proper position. Fig. 3 is a face view with the cover and rolls removed. Fig. 4 is a transverse section in the plane $y\,y$, Fig. 1, with the cover on. Fig. 5 is a plan or top view. Fig. 6 is a similar view, part of the casing being broken away. Fig. 7 is an elevation taken from the rear of the holder. Figs. 8, 9, 10, and 11 are detail views illustrating the construction of the receiving-roll. Fig. 12 is a sectional elevation of a detail part. Fig. 13 is a transverse section in the plane $z\,z$, Fig. 1. Fig. 14 is a section in the plane $x'\,x'$, Fig 3. Fig. 15 is a transverse section in the plane $y'\,y'$, Fig. 3. Fig. 16 is a transverse section illustrating a modification. Fig. 17 is a face view of a portion of the film.

Similar letters indicate corresponding parts throughout the several views.

In the drawings, referring at present to Figs. 1, 2, and 3, the letter A designates a case adapted to contain the supply and receiving rolls, the film-support, and the operating mechanism, said case being provided with a cover A', removably secured thereto by any suitable means. The front of the case, as usual, is open and provided with a closing slide A², fitted into grooves or ways in the case.

B is the supply-roll, and C is the receiving-roll, located on opposite sides of the case. The film P passes from the supply-roll in front of the film-support D and to the receiving-roll. The said film-support is removably secured to the case by means of the turn-buckles $a\,a$, Figs. 1 and 3, and forms a base for the several devices for slitting the film, for measuring the film, for arresting the motion of the receiving-roll, and for the device for actuating the counter, all said devices being arranged and secured thereon and removed therewith. (See Fig. 3, especially.)

Referring to Fig. 1, E represents a device for perforating or slitting the film, which may consist of a sharp blade or knife arranged in proximity to the edge of the film-support D and pivoted at $b$, so as to swing across the path of the film directly above the said support when turned about its pivot. The knife is provided with an arm $c$, adapted to be engaged by one arm of a tumbler F, pivoted at $d$, Figs. 1 and 3, to the film-support. When the tumbler is turned in the direction of arrow 10, Fig 1, the knife is caused to slit the paper from point 1 to point 2, as shown in Fig. 17, its final position being shown by full lines in Fig. 3. A spring $f$ returns the tumbler to its normal position and a spring $g$ returns the knife to its position against stop $h$.

In proximity to the opposite edge of the film-support D is arranged a measuring device G, which may be in the form of a lever pivoted at $i$ to the film-support and provided with a blunt blade $j$, arranged in line with the slits formed in the film by the knife E, and is constantly pressed against the film by a spring $k$. When a slit is brought opposite the blade of the measuring device—i. e., when the film has been advanced by the proper length for an exposure—the blade passes through the perforation or slit until its motion is arrested by a stop $l$ and locks the film from further movement. The lever by its contact with the metallic stop *l* gives audible evidence of such locking or measurement. A visible indication of the position of the measuring device is also given, as will be subsequently explained.

To prevent the film from being torn by inadvertently turning the receiving-roll after the film is locked by the measuring device A, I provide an additional device which locks the receiving-roll, said locking device being actuated by the movement of the film-measuring device and acting to lock the receiving-roll simultaneously with the passage of the measuring device through the perforation in the film. To this end a slide H is mounted upon the film-support D and provided with a tooth *m*, arranged to engage with a toothed wheel *n*, connected with the receiving-rolls and rotating in unison therewith. (See Figs. 1, 3, and 4.) The slide H is engaged by an arm *o* of the measuring-lever G, said arm playing between two pins *p* and *q* on the said slide. When the lever G is in the position indicated by broken lines in Fig. 3, it has moved the slide H to bring the tooth *m* out of contact with the toothed wheel *n*. When, however, the lever snaps into the perforation in the film, the slide is drawn forward to cause the tooth *m* thereof to engage with the toothed wheel, thereby checking the motion of the receiving-roll until the lever has been withdrawn from the slit by turning the tumbler F in the proper direction.

It will be seen that the device G co-operates with the perforating device to set off in each instance a determined length of film for exposure, thereby dispensing with the use of the usual measuring roll or rolls.

To indicate the number of exposures made, I make use of a counter, located, preferably, at the top of the case A and consisting of a gear-wheel J*, having thereon a concentric series of numbers arranged to be brought successively in line with an opening *r* in the case. The gear-wheel J* is engaged by a small pinion *s*, Fig. 6, mounted upon a common shaft with a toothed wheel *t*, Fig. 2. This latter wheel is engaged by a star-wheel *u* or other suitable spring-pressed pawl carried by a lever *v*, pivoted at *w* to the film support and having its opposite end in a pin-and-slot connection with an arm *e*, projecting from the knife E, so that whenever the latter is oscillated to cut the film the lever *v* is turned about its pivot, as seen in Fig. 3, to actuate the counter.

To actuate the tumbler F from the exterior of the case, it is provided with a hub $a'$, having a slot $a^3$, into which enters a key I, secured to the cover A'. (See Figs. 2, 7, and 12, especially.) The key I is permanently secured, so as to be capable of rotation and a movement in the direction of its length in the cover, and is supported upon a spiral spring $b'$, encircling its shank. The lower end of the key is provided with a flat extension $c'$, which enters the slot $a'$ in the tumbler, it being guided to enter said slot by the cam-shaped walls of the hub $a'$, (see Fig. 2,) no matter what position it may be in when the cover is applied. The upper end of the key has a head I', playing within a suitable recess in the cover of the case.

I will now proceed to describe the means for supporting the rolls and for inserting and removing the same.

In the top and bottom of the case, in the correct position to correspond to the ultimate position of the supply-rolls, are formed guideways $c^3 c^2$, into which are fitted bearing-plates J J', which can slide freely in the same and are provided with suitable heads for moving them in and out. These bearing-plates are provided with centers $d'$ and $d^2$, adapted to enter suitable sockets in the opposite ends of the roll, and the center $d'$ is in addition provided with a sliding follower $e'$, acted upon by a spring $f'$. On the center $d^2$ is loosely mounted a disk $g'$, provided with a pin $h'$, which enters a slot in the roll for turning the latter to adjust the film. Between the said disk and the interior face of the bearing-plate J' are located two rubber friction-disks $i' i^2$, one of which is attached by a pin $j'$ to the disk $g'$ and the other to the said bearing-plate by a pin $k$, Fig. 14.

The bearing-plates J J' are hinged to followers $l' l^2$, moving in the same guideways as the former, so that by drawing the bearing-plates outward until the hinges are on a level with the edge of the case said plates can be swung outward about their hinges, as shown in Figs. 3, 14, and 15, for the removal or insertion of the roll. Suitable stops, as $m' m^2$, limit the outward movement of the followers.

The receiving-roll is mounted in similar bearing-plates $J^2 J^3$, and is rotated by means of the handle K, which passes through one wall of the casing and the bearing-plate and is provided with a threaded portion $n'$, engaging with a nut $o'$, secured in the roll, Fig. 13.

It will be observed that the rubber friction-disks $i' i^2$, subject to the pressure of the springs $f' f'$, have a tendency to rotate the rolls in a direction opposite to that in which they are rotated when the film is shifted for a new exposure, thereby causing the film to be drawn taut.

To secure the free end of the film to the receiving-roll, Figs. 8, 9, 10, and 11, a longitudinal groove $p'$ is formed in the latter, and to one end of the same is secured the head of a spring-clip $q'$, which extends throughout the length of the groove $p'$, its opposite head being secured by the pin $r'$. The end of the roll, where the clip is permanently fastened, is cut away, as at $s' s'$, to facilitate the introduction of the film, and the opposite end of the roll is cut away, as at $t' t'$, to permit the clip to be depressed for its insertion in the fastening-pin $r'$. To secure the roll to the toothed wheel *n*, the head of the clip is provided with a narrow portion or neck $u'$, which fits between two cheeks $v'$, formed on the face of the wheel $n$.

In larger cameras, where the friction of the film in passing over the edges of the film-support might be excessive, I make use of guide-rolls such as L L, Fig. 16, said rolls being, preferably, equal in diameter to the thickness of the film-support D, so that the perforating and measuring levers can pass over the same in their operation. When the rolls are larger in diameter, they are cut away to afford clearance for the perforating and measuring devices.

In the operation of the roll-holder, assuming the parts to be in their normal position, as shown in Fig. 1, the film is perforated by turning the key I to the right, Fig. 7. The key is then turned to the left to the full extent of its motion, thereby causing the measuring device to be withdrawn from the film and the locking device to free the receiving-roll. The receiving-roll is now turned to move the film to bring the perforation behind the lever of the measuring device, whereupon the key may be released and the roll turned until again locked by the locking device to set off a new length of film for exposure.

It will be seen that when the several operating devices are in their normal positions—i. e., when the receiving-roll is locked—the head I' of the key I is vertically disposed, Figs. 1 and 7, and when the measuring device is bearing upon the film it is in an oblique position, as shown by dotted lines in Fig. 7. When the measuring device snaps into a perforation, the key is again turned into the vertical position, thereby giving visible indication of the locking of the film.

It is evident that the measuring and perforating devices could be arranged to slide toward and from the film instead of oscillating about a pivot, and that the general details could be changed without departing from the spirit of the invention.

What I claim as new, and desire to secure by Letters Patent, is—

1. In a roller holder, a perforating device adapted to penetrate the film and a measuring device adapted to enter the perforations, substantially as described.

2. In a roller-holder, a perforating device adapted to penetrate the film and a measuring device held in contact with the film by spring-pressure and adapted to enter the film, substantially as and for the purpose specified.

3. In a roller-holder, a perforating device arranged to penetrate the film and a device co-operating with the perforating device to measure off the film and to lock the same, substantially as described.

4. In a roller-holder, a perforating device arranged to penetrate the film, a measuring device co-operating with the perforating device, and a lock engaging with one of the rolls, substantially as described.

5. In a roller-holder, a perforating device, a measuring device co-operating with the perforating device, and a lock constructed to act simultaneously with the film-measuring device, substantially as described.

6. In a roller-holder, a perforating device, a measuring device co-operating with the perforating device, and a lock actuated by the movement of the measuring device to lock one of the rolls, substantially as described.

7. The combination, with the supply and receiving rolls and the film-support, of a perforating and measuring device acting at opposite edges of the film-support, substantially as and for the purpose specified.

8. The combination, with the supply and receiving rolls and the film-support, of a perforating device, a measuring device, and a common tumbler or its equivalent for actuating the perforating device and for withdrawing the measuring device, substantially as described.

9. In a roller-holder, a perforating device, a measuring device co-operating with the perforating device, and a counter, substantially as described.

10. In a roller-holder, a perforating device, a measuring device co-operating with the perforating device, and a counter actuated by the movement of the perforating device, substantially as described.

11. In a roller-holder, the supply and receiving rolls, in combination with sliding plates for supporting said rolls capable of being moved in and out independently of the film-support, substantially as described.

12. In a roller-holder, the supply and receiving rolls, in combination with the hinged sliding bearing-plates, substantially as described.

13. In a roller-holder, a sliding bearing-plate provided with a hinged follower and a center, substantially as described.

14. In a roller-holder, a detachable film-support provided with attached perforating and measuring devices, all removable with said film-support, and bearings for the rolls guided in the casing and separate from the film-support, said bearings remaining in the casing on the removal of the film-support, substantially as described.

15. In a roller-holder, a perforating device, a measuring device, a tumbler engaging with the same, as described, and a key for engaging and actuating said tumbler, substantially as described.

16. In a roller-holder, a perforating device, a measuring device, a tumbler, and a spring-supported key secured to the cover of the case, substantially as described.

17. In a roller-holder, the slotted tumbler for engaging the perforating and measuring devices, in combination with the spring-supported key having flat termination $c'$ and head I', substantially as described.

18. In a roller-holder, a case provided with opposite guideways, bearing-plates fitted into the guideways, followers hinged to said bearing-plates, and stops for limiting the movement of the followers, substantially as described.

19. In a roller-holder, a counter consisting of gears J and S, toothed wheel $t$, and lever $v$, provided with spring-pawl $u$, substantially as described.

20. In a roller-holder, the combination of the receiving-roll, the sliding lock H, provided with tooth $m$, wheel $n$, and lever G, engaging with the lock H, substantially as described.

21. In a roller-holder, the combination of a roll, the rubber friction-disks bearing against each other and secured, respectively, to the roll and to a stationary part of the holder, and a spring, substantially as described.

22. The combination, with a bearing-plate having a projecting center, of the friction-disks $i'$ $i^2$, and plate $n$, arranged upon said center, and a bearing-plate arranged opposite and provided with a projecting center and a spring, substantially as described.

23. The roll C, provided with longitudinal groove $p'$, in combination with the spring-clip capable of being swung about its end to permit the insertion or removal of the film, substantially as described.

24. The roll C, provided with longitudinal groove $p'$, in combination with the spring-clip $q'$, secured to one end of the roll and pin $r'$, and recess for securing the free end of the clip, substantially as described.

25. The roll C, provided with longitudinal groove $p'$ and recesses $s'$ $s'$ and $t'$ $t'$, in combination with the spring-clip $q'$, substantially as described.

26. The roll C, provided with spring-clip $q'$, having neck $u'$, in combination with plate $u$, having cheeks $r'$ $r'$, substantially as described.

In testimony that I claim the foregoing as my invention I have signed my name, in presence of two witnesses, this 8th day of February, 1890.

HERMANN G. RAMSPERGER.

Witnesses:
A. FABER DU FAUR,
GEO. WADMAN.